(12) United States Patent
Cusano

(10) Patent No.: US 7,472,849 B2
(45) Date of Patent: Jan. 6, 2009

(54) LARVICIDE DISPENSER

(76) Inventor: Glenn F. Cusano, 23 Sunny Heights Rd., Granby, CT (US) 06035

( * ) Notice: Subject to any disclaimer, the term of this patent is extended or adjusted under 35 U.S.C. 154(b) by 396 days.

(21) Appl. No.: 11/149,812

(22) Filed: Jun. 10, 2005

(65) Prior Publication Data

US 2006/0285950 A1   Dec. 21, 2006

(51) Int. Cl.
*A01C 3/06* (2006.01)
(52) U.S. Cl. .............. 239/650; 222/610; 239/578; 239/668; 239/689
(58) Field of Classification Search ......... 222/608–610, 222/180; 43/132.1; 239/172, 650, 661, 663, 239/668, 670, 689, 578, 655, 664–666, 669; 248/503
See application file for complete search history.

(56) References Cited

U.S. PATENT DOCUMENTS

| | | | | | |
|---|---|---|---|---|---|
| 1,069,767 | A | * | 8/1913 | Clarke | 222/610 |
| 2,232,825 | A | * | 2/1941 | May | 111/130 |
| 2,307,798 | A | * | 1/1943 | Kook et al. | 222/610 |
| 2,322,171 | A | * | 6/1943 | Spatz | 222/608 |
| 2,822,957 | A | * | 2/1958 | Johnson | 222/610 |
| 2,909,383 | A | * | 10/1959 | Nanfeldt | 291/23 |
| 2,948,306 | A | * | 8/1960 | Kuraeff | 222/608 |
| 4,252,274 | A | * | 2/1981 | Kubacak | 239/163 |
| 4,535,914 | A | | 8/1985 | Coty | |
| 5,193,721 | A | | 3/1993 | Gryder | |
| 5,533,676 | A | | 7/1996 | Conley | |
| 2002/0040916 | A1 | * | 4/2002 | Hibbs | 224/482 |

* cited by examiner

*Primary Examiner*—Len Tran
*Assistant Examiner*—Jason J Boeckmann
(74) *Attorney, Agent, or Firm*—Alix, Yale & Ristas, LLP

(57) ABSTRACT

A device for an operator sitting in the driver's seat of a vehicle to deposit a quantity of material at a target location on the ground adjacent the passenger side of the vehicle, from a hopper having a discharge aperture and a valve for selectively opening and closing the discharge aperture. The hopper is removably mountable to the passenger side of the vehicle. A discharge tube is operatively associated with the hopper discharge aperture and extends from the hopper, for receiving material from the hopper and discharging the material substantially at ground level adjacent the passenger side of the vehicle. A controller within reach of the driver and operatively associated with the valve permits opening and closing the valve and thereby selectively depositing a controlled quantity of granular material.

12 Claims, 5 Drawing Sheets

LARVICIDE DISPENSER

BACKGROUND OF THE INVENTION

The present invention relates to the precise, ground level distribution of controlled quantities of granular material, particularly pest suppressants, at a multiplicity of distinct locations Mosquito vector control in the United States has traditionally been carried out by State, County and Local Health Departments and their contractors. The elimination of mosquitoes as a health hazard and public nuisance is most effectively accomplished by treating stagnant water with a granular mosquito larva-killing product commonly referred to as "larvicide". Larvicide works by melting across the surface of stagnant water where the female mosquito lays hundreds of eggs after ingesting a blood meal from a warm blooded animal, including humans. The mosquito larva ingests the larvicide treated water, and dies soon after. Certain species of mosquitoes can transmit life threatening illnesses to humans. Many of these species lay their eggs in common "catch-basins"; also know as "storm-drains" which are found along roadways in mostly in urban and suburban settings, areas of high human population. These structures have inherent in their design, a "sump" at the bottom of the basin which collects silt and other debris. This "sump" is also notorious for holding stagnant water for long periods. The female mosquito which transmits West Nile Virus to humans is known to lay eggs in these "sumps". An untreated catch-basin can become a nursery for literally tens of thousands of mosquitoes.

Common practice of most health departments in applying larvicide to catch-basins has in the past involved scooping larvicide from a pail and pouring it directly into the basin. This task is normally at least a two-person function, and is highly labor intensive, messy, and potentially hazardous to the person administering the larvicide if conducted from the rear of pick-up trucks or from golf cart style vehicles, particularly in high-traffic areas.

SUMMARY OF THE INVENTION

Accordingly, there is a need for a lightweight, easy to use device that can be mounted to the passenger side of an automobile, which can be operated by the driver, and which can deliver a consistent, clean, accurate dose of larvicide to the catch-basin with the lowest possible risk of bodily harm to the operator, and with the maximum efficiency in the killing of potentially deadly mosquito larvae.

In one aspect, the present invention is directed to a device for an operator sitting in the driver's seat of a vehicle to deposit a quantity of material at a target location on the ground adjacent the passenger side of the vehicle, from a hopper having a discharge aperture and a valve for selectively opening and closing the discharge aperture. The hopper is removably mountable to the passenger side of the vehicle. A discharge tube is operatively associated with the hopper discharge aperture and extends from the hopper, for receiving material from the hopper and discharging the material substantially at ground level adjacent the passenger side of the vehicle. A controller within reach of the driver and operatively associated with the valve permits opening and closing the valve and thereby selectively depositing a controlled quantity of granular material.

In the preferred embodiment, a pair of upper support arms extend laterally of the hopper and are curved downwardly for positioning through the passenger side window opening to engage the inside panel of the door, and a pair of lower support arms extend obliquely from the hopper below the upper support arms for bearing on an exterior surface of the door panel, thereby supporting the hopper in lateral spaced relation to the door. The discharge tube has one end spaced below and operatively associated with the hopper discharge aperture, between the lower support arms and extending downwardly for approximately the height of the door to the discharge end. The control assembly is attached to the hopper and extends from the valve laterally of the hopper beyond the upper support arms toward the driver. The free end of the control assembly is accessible to the driver's hand, and includes a trigger for opening and closing the valve and thereby selectively depositing a controlled quantity of granular material at said location.

The hopper can be considered as having an open top with detachable cover, a mounting side for attachment of the upper and lower support arms, a front that faces the same direction as the vehicle, a back that faces the direction of the rear of the vehicle, an exposed side opposite the mounting side, and a bottom in which the discharge aperture is situated. A pair of mounting brackets are attached to the mounting side of the hopper, and the upper and lower support arms are attached to the mounting brackets. The control assembly preferably includes a pair of upper control arms attached to the mounting bracket and extending above and substantially parallel to the upper support arms, a pair of lower controls arms extending obliquely downward from the upper control arms and joined as a handle at the free end, with the trigger supported on the handle, and the flexible cable having one end connected to the trigger and another end connected to the valve.

Preferably, the mounting brackets comprise parallel, spaced apart tubes attached to the mounting side of the hopper and extending below the bottom of the hopper. One of the upper support arms and one of the lower support arms are at opposite sides of one unitary, bent tube and the other of the upper support arms and the other of the lower support arms are at opposite sides of another unitary, bent tube. The one bent tube and the other bent tube are connected to respective mounting tubes below the hopper. The lower support arms are situated between the discharge tube and the one bent tube and the mounting tubes.

A calibration knob can be operatively associated with the cable and the trigger, to adjust the cable length and thus the quantity that is discharged for with the pull of the trigger. Similarly, the lower control arms and the upper control arms can be pivotally connected and lockable to a selected angle and thus tension in the cable.

A mirror is preferably mounted on the hopper to extend beyond the exposed side of the hopper and oriented such that the discharge end of the discharge tube and the ground below said discharge end are visible to the operator in the driver's seat.

DESCRIPTION OF THE PREFERRED EMBODIMENT

Figure 1:
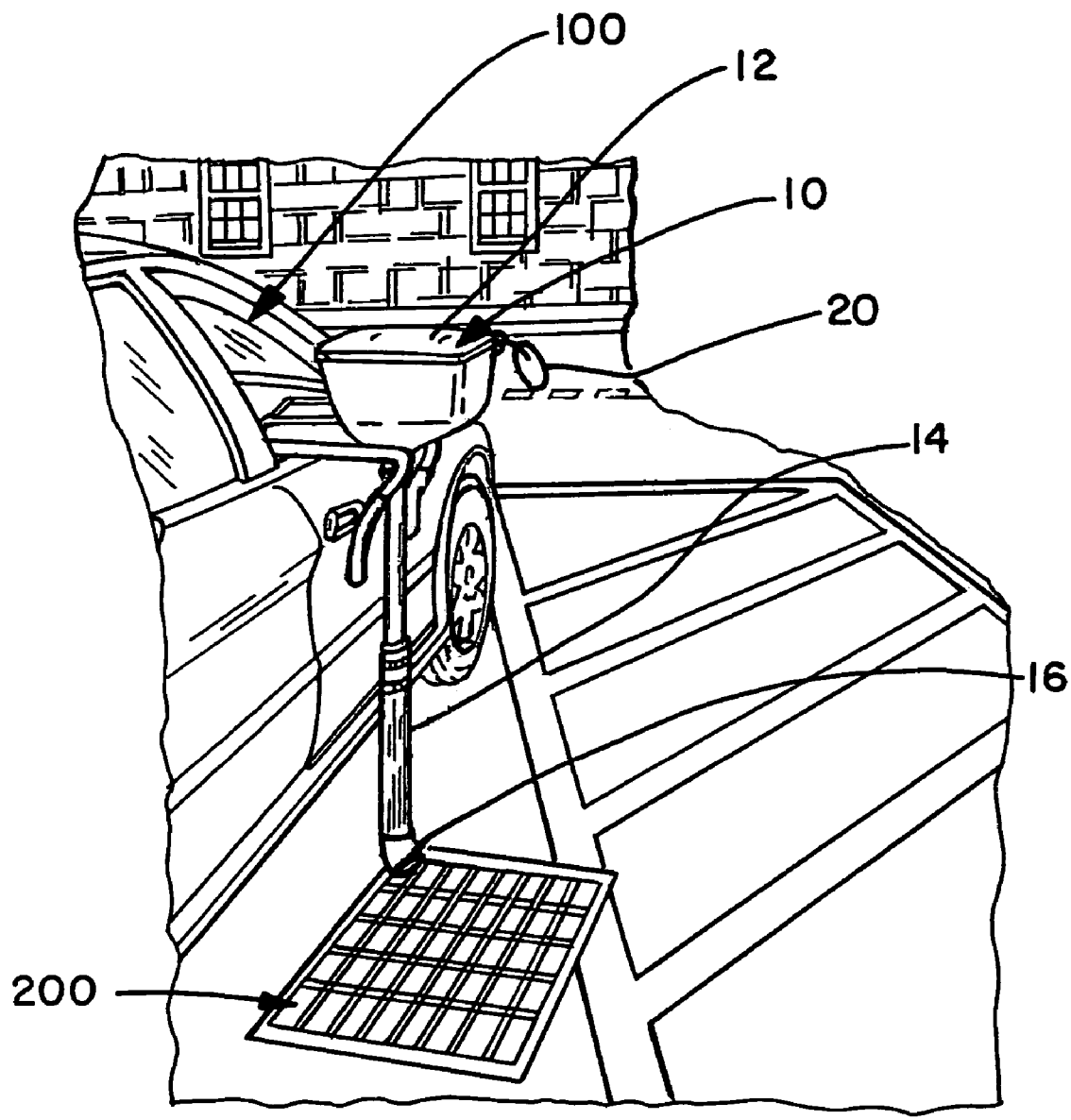
FIG. 1 is a schematic representation of the device in the use, as mounted on an automobile for applying larvicide into a catch basin.
Figure 2:
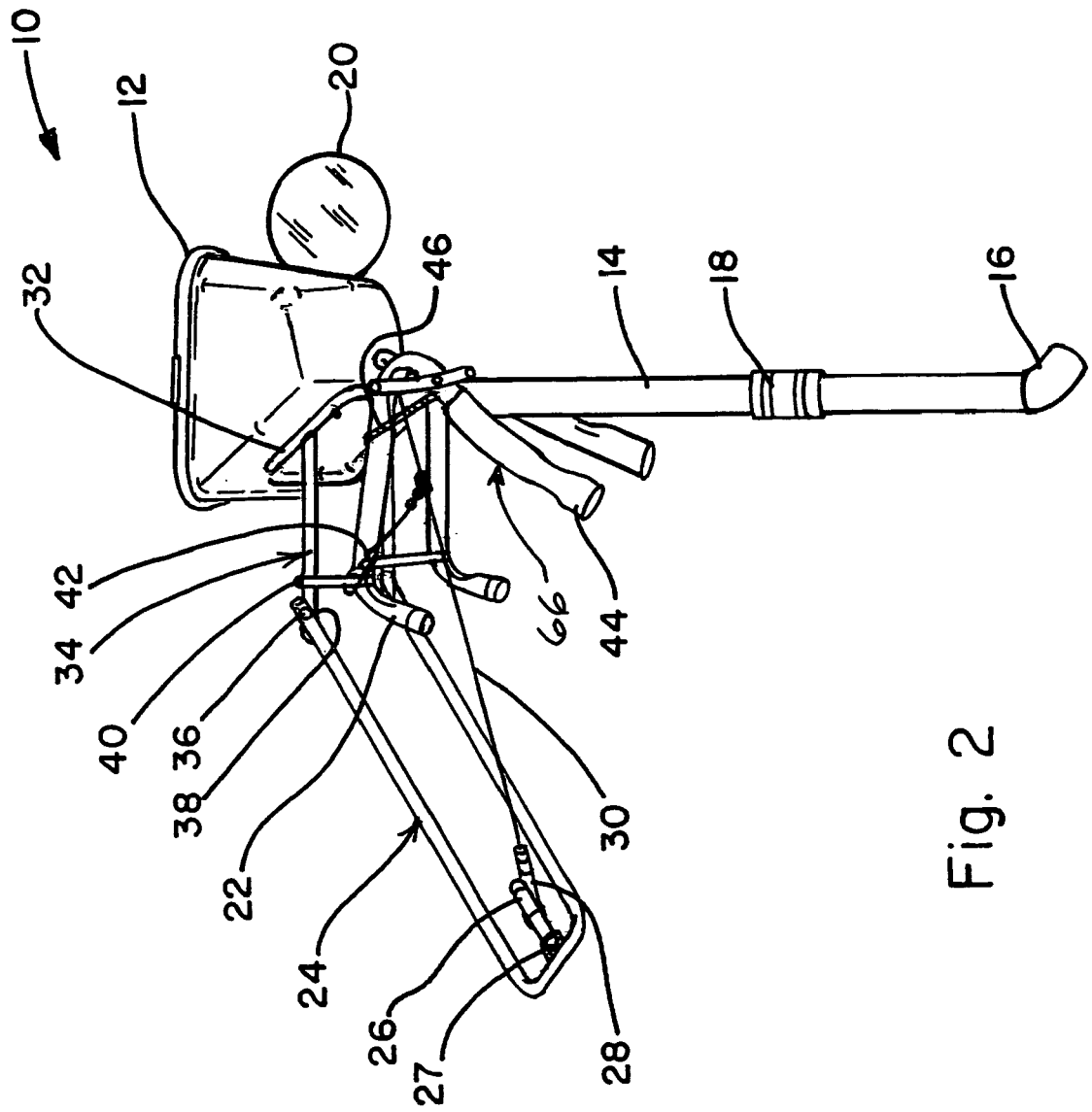
FIG. 2 is a perspective view from the underside of the device, before mounting on the automobile.
Figure 3:
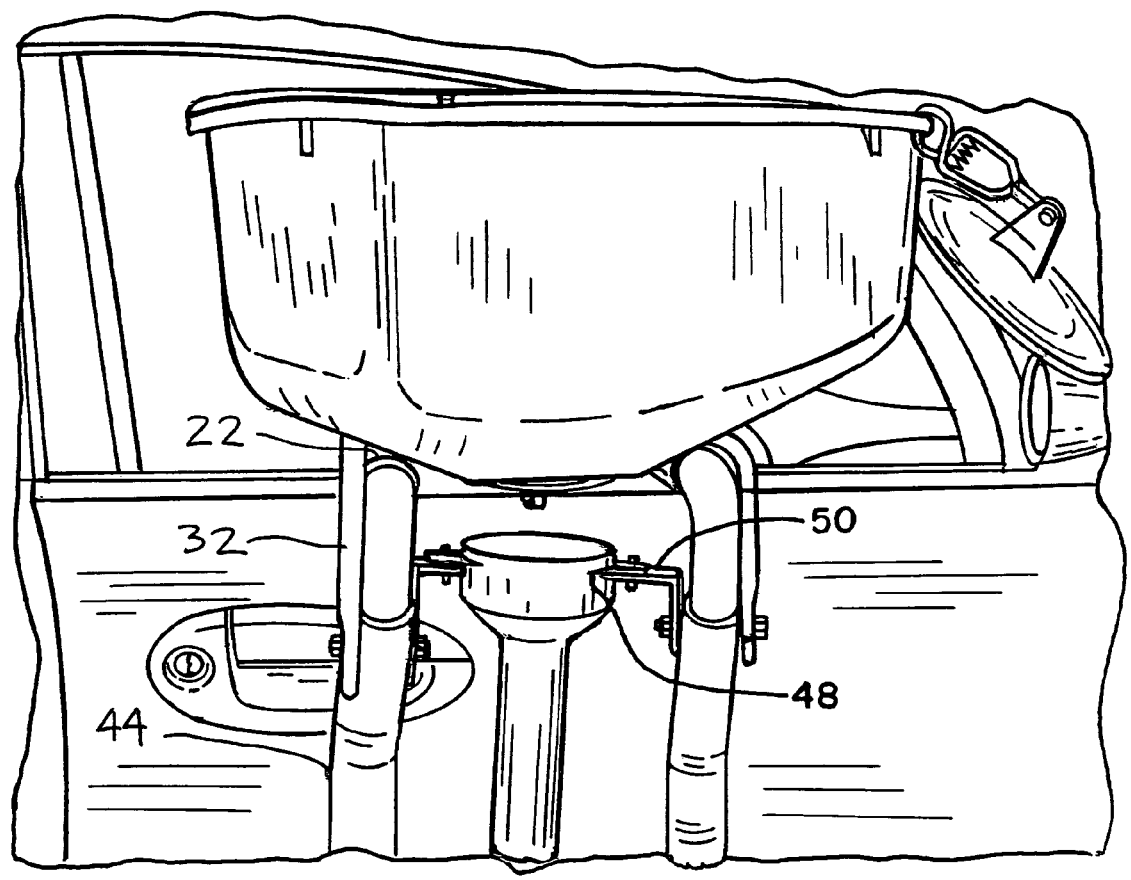
FIG. 3 is a close-up view of the hopper portion and associated mounting and support tubes and discharge tube.
Figure 4:
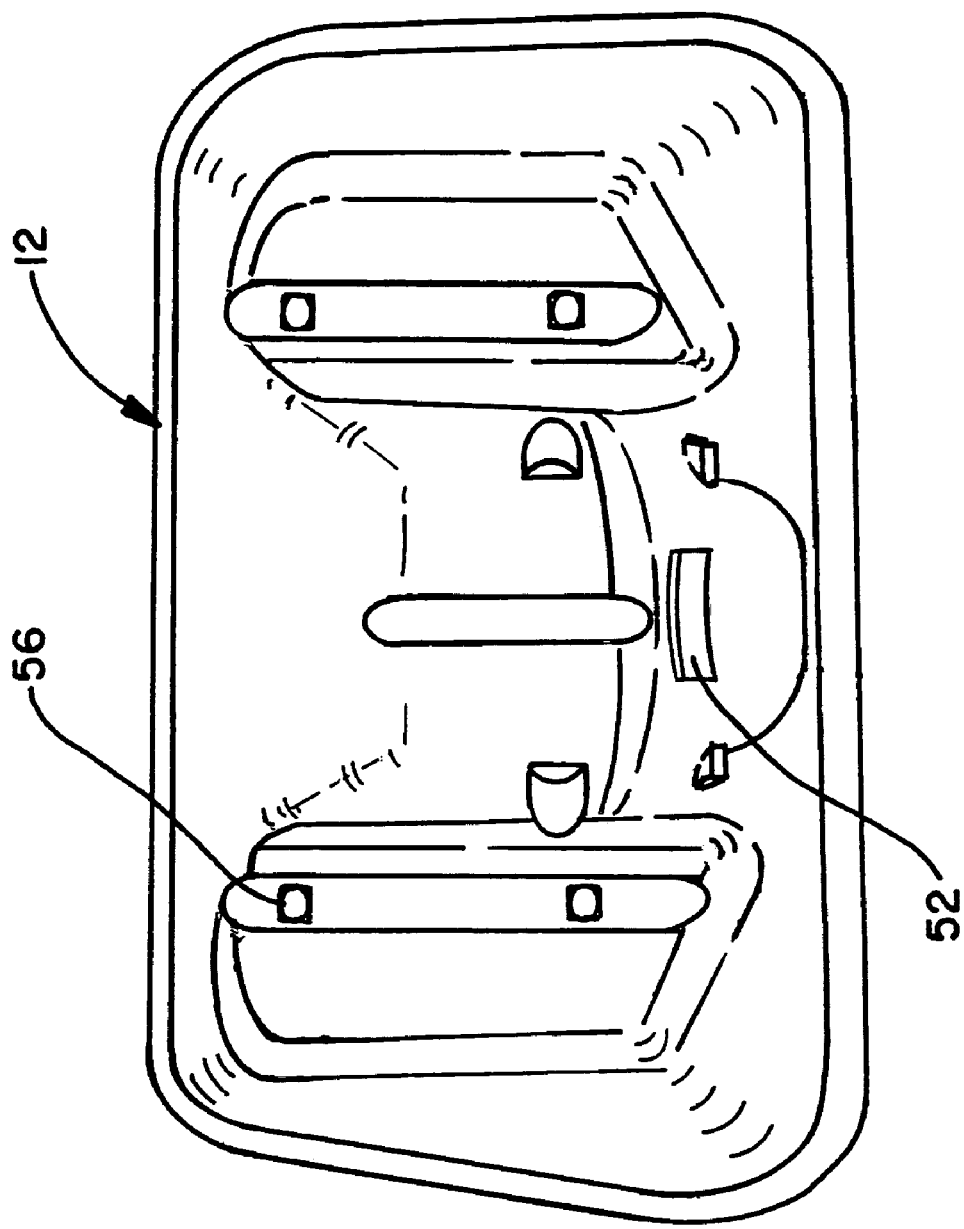
FIG. 4 is a view of the hopper from above.
Figure 5:
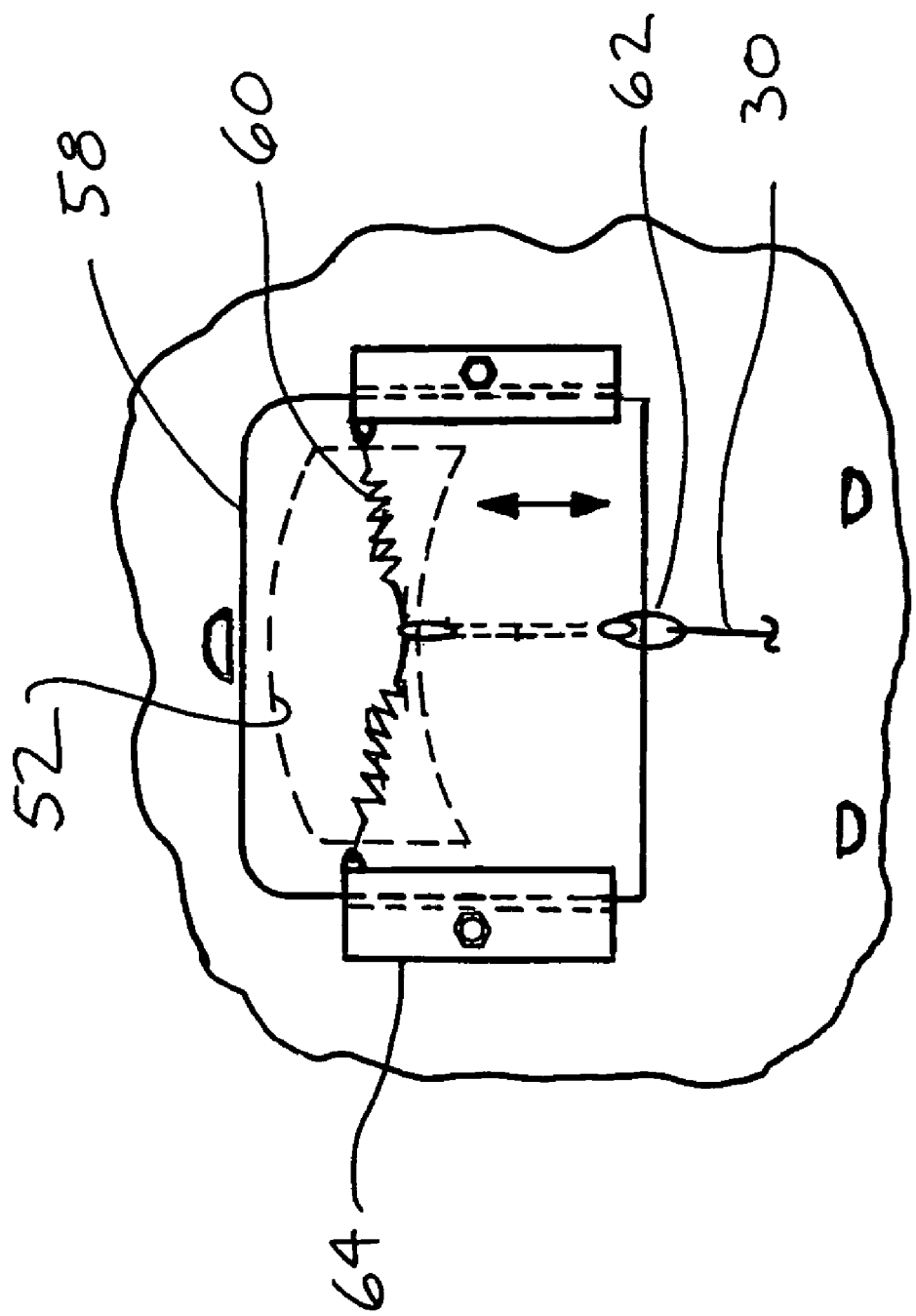
FIG. 5 is a detail view of the bottom portion of the hopper, where the valve operates to open and close the aperture.

FIG. 1 is a schematic representation of the preferred larvicide dispensing device 10 mounted on an automobile 100 as positioned over the grate 200 of a drain or catch basin a parking lot or the like. The main components of the device in this view, include a hopper 12 with associated lid and a mirror 20 by which the driver of the automobile can position the vehicle so that the discharge tube 14 and associated chute 16 are directly over the catch basin grate 200.

Referring now to FIGS. 1-5, mosquito larvicide dispensing device 10 embodying the principles and concepts of the present invention comprises a larvicide hopper 12 with a clear lid. Padded exterior door mounts 44 and interior door mounts 22 are in the form of lower and upper support arms. A lower control arm assembly 24 extends into the interior of the automobile and contains a hopper valve activation trigger 26 and a discharge quantity calibration knob 28 which connects to a flexible wire hopper valve activator cable 30. The cable opens a larvicide discharge valve 58, releasing larvicide into the larvicide discharge cup 48 through the larvicide discharge valve opening 52. The larvicide discharge valve return springs 60 return the larvicide discharge valve 58 to the closed position. Larvicide travels down the larvicide discharge tube 14, and out to the catch-basin from the 45 degree discharge chute 16.

The hopper valve activation trigger 26, attaches to the lower control arm assembly 24 by means of a discharge trigger pivot point 27 for maximum flexibility. The flexible wire hopper activation cable 30 attaches from the discharge quantity calibration knob 28 to the activator cable fine adjuster 62 used to further adjust discharge rate. The lower control arm assembly 24 can be adjusted for flexible wire hopper valve activator cable 30 tension, by means of the quick storage pivot points 38 controlled by adjusting the quick storage lock nuts 36, as well as for storage in a car trunk or closet.

The larvicide discharge cup mounting brackets 50 allow the larvicide discharge tube 14 to swing in and out to compensate for automobile movement. The larvicide discharge tube 14 is adjustable for height via the larvicide tube height adjustment sleeve 18. The 45 degree discharge chute 16 provides the correct angle of distribution of the larvicide into the catch-basin grate 200.

The door mount assembly 66, consists of the padded exterior door mounts 44 which press against the exterior of the passenger door of the automobile 100, and the interior door mounts 22 which press against the interior passenger door of the automobile 100. Reinforcement brackets 40 provide stability by connecting to the interior door mounts 22 to the upper control arm assembly 34.

The hopper mounting tubes 32 connect the larvicide hopper via the larvicide hopper mounting tube bolts 56, to the upper control arm assembly 34.

The quick connect security chain 46 ensures that the larvicide hopper 12 remains attached to the automobile 100 at all times by connecting to an interior secure component such as the passenger head rest assembly.

The invention claimed is:

1. A device mountable through the passenger side door window opening of an automobile for enabling the driver while in the driver's seat to deposit granulated material at a target location on the ground adjacent the passenger side door, comprising:

a hopper having a discharge aperture and a valve for selectively opening and closing the discharge aperture;

a pair of upper support arms extending laterally from the hopper and curved downwardly for positioning through the passenger side window opening to engage the inside panel of the door, and a pair of lower support arms extending obliquely from the hopper below the upper support arms for bearing on an exterior surface of the door panel, thereby supporting the hopper in lateral spaced relation to the door;

a discharge tube having one end operatively associated with the hopper discharge aperture between the lower and upper support arms and extending downwardly approximately the height of said door to a discharge end, for receiving granulated material from the hopper and discharging the material substantially at ground level adjacent the door;

a control assembly attached to the hopper and extending from the valve laterally of the hopper beyond the upper support arms, including a trigger for opening and closing the valve and thereby selectively depositing a controlled quantity of granular material at said location, the hopper has an open top with detachable cover, a mounting side for attachment of the upper and lower support arms, a front that faces the same direction as the vehicle, a back that faces opposite the front, an exposed side opposite the mounting side, and a bottom in which the discharge aperture and valve are situated, a pair of mounting brackets are attached to the mounting side of the hopper, and the upper and lower support arms are attached to the mounting brackets.

2. The device of claim 1, wherein the valve is biased into the closed condition and pulling of the trigger by the operator overcomes the bias to open the valve.

3. The device of claim 2, wherein the control assembly includes a pair of upper control arms attached to said mounting bracket and extending above and substantially parallel to the upper support arms, a pair of lower controls arms extending obliquely downward from the upper control arms and joined as a handle that supports said trigger, and a flexible cable having one end connected to the trigger and another end connected to the valve.

4. The device of claim 3, wherein a calibration knob is operatively associated with the cable and the trigger, to adjust the cable length and thus the quantity that is discharged with the pull of the trigger.

5. The device of claim 3, wherein the lower control arms and the upper control arms are pivotally connected and lockable to a selected angle and thus tension in the cable.

6. The device of claim 1, wherein the discharge tube has an angled chute.

7. The device of claim 1, wherein the discharge aperture is in the bottom of the hopper, said one end of the discharge tube is positioned in spaced relation below the aperture, the discharge tube is supported in said position by attachment to the lower support arms.

8. The device of claim 7, wherein the mounting brackets comprise parallel, spaced apart tubes attached to the mounting side of the hopper and extending below the bottom of the hopper, one of the upper support arms and one of the lower support arms are at opposite sides of one unitary, bent tube and the other of the upper support arms and the other of the lower support arms are at opposite sides of another unitary, bent tube, and the one bent tube and the other bent tube are connected to respective mounting tubes below the hopper.

9. The device of claim 8, wherein the lower support arms are situated between the discharge tube and the mounting tubes.

10. A device mountable through the passenger side door window opening of an automobile for enabling the driver while in the driver's seat to deposit granulated material at a target location on the ground adjacent the passenger side door, comprising:

a hopper having a discharge aperture and a valve for selectively opening and closing the discharge aperture;

a pair of upper support arms extending laterally from the hopper and curved downwardly for positioning through the passenger side window opening to engage the inside panel of the door, and a pair of lower support arms extending obliquely from the hopper below the upper support arms for bearing on an exterior surface of the door panel, thereby supporting the hopper in lateral spaced relation to the door:

a discharge tube having one end operatively associated with the hopper discharge aperture between the lower and upper support arms and extending downwardly approximately the height of said door to a discharge end, for receiving granulated material from the hopper and discharging the material substantially at ground level adjacent the door:

a control assembly attached to the hopper and extending from the valve laterally of the hopper beyond the upper support arms, including a trigger for opening and closing the valve and thereby selectively depositing a controlled quantity of granular material at said location, including a mirror mounted on the hopper and oriented such that the discharge end of the discharge tube and the ground below said discharge end are visible to the operator in the driver's seat.

11. The device of claim 10, wherein the mirror extends beyond the exposed side of the hopper.

12. A device mountable through the passenger side door window opening of an automobile for enabling the driver while in the driver's seat to deposit granulated material at a target location on the ground adjacent the passenger side door, comprising:

a hopper having a discharge aperture and a valve for selectively opening and closing the discharge aperture;

a pair of upper support arms extending laterally from the hopper and curved downwardly for positioning through the passenger side window opening to engage the inside panel of the door, and a pair of lower support arms extending obliquely from the hopper below the upper support arms for bearing on an exterior surface of the door panel, thereby supporting the hopper in lateral spaced relation to the door;

a discharge tube having one end operatively associated with the hopper discharge aperture between the lower and upper support arms and extending downwardly approximately the height of said door to a discharge end, for receiving granulated material from the hopper and discharging the material substantially at ground level adjacent the door;

a control assembly attached to the hopper and extending from the valve laterally of the hopper beyond the upper support arms, including a trigger for opening and closing the valve and thereby selectively depositing a controlled quantity of granular material at said location, wherein the discharge tube has a lower portion that is coaxially adjustably connected to an upper portion and thereby adjusts the total length of the discharge tube.

* * * * *

UNITED STATES PATENT AND TRADEMARK OFFICE
CERTIFICATE OF CORRECTION

PATENT NO. : 7,472,849 B2
APPLICATION NO. : 11/149812
DATED : January 6, 2009
INVENTOR(S) : Cusano Page 1 of 1

It is certified that error appears in the above-identified patent and that said Letters Patent is hereby corrected as shown below:

Column 4:

Line 25, delete "guantity" and substitute --quantity--.

Line 26, before "the hopper" insert --wherein--.

Column 5:

Line 25, after "door" delete ":" and substitute --;--.

Line 32, after "door" delete ":" and substitute --;--.

Column 6:

Line 33, delete "guantity" and substitute --quantity--.

Signed and Sealed this

Twenty-fourth Day of March, 2009

JOHN DOLL
*Acting Director of the United States Patent and Trademark Office*